June 20, 1967 W. SICHAK 3,327,216
ARRANGEMENT FOR MINIMIZING EFFECTS OF NOISE BY
AUTOMATIC FREQUENCY DEVIATION CONTROL
IN FM COMMUNICATION SYSTEMS
Filed Aug. 18, 1964 2 Sheets-Sheet 1

INVENTOR.
WILLIAM SICHAK
BY
Hopgood & Calimafde
ATTORNEYS.

INVENTOR.
WILLIAM SICHAK
BY
Hopgood & Calimafde
ATTORNEYS.

United States Patent Office 3,327,216

Patented June 20, 1967

3,327,216

ARRANGEMENT FOR MINIMIZING EFFECTS OF NOISE BY AUTOMATIC FREQUENCY DEVIATION CONTROL IN FM COMMUNICATION SYSTEMS

William Sichak, Nutley, N.J., assignor to Sichak Associates, Nutley, N.J., a corporation of New Jersey

Filed Aug. 18, 1964, Ser. No. 390,294
11 Claims. (Cl. 325—45)

This invention relates to an arrangement for minimizing the effect of noise in radio communication systems; in particular to those employing frequency modulated (FM) carriers for the transmission of single and multichannel intelligence.

In predicating the design of a radio system for the transmission of intelligence, the usual considerations of transmitter power, antenna gain, distance and so forth underlie the choice of circuitry and adjunct equipment to be utilized. Normally, based upon an economic incentive, the transmitter power, antenna gain, etc. are chosen to provide a minimum acceptable noise level for a given percentage of time at the lowest cost.

Once the system has been designed and installed, a degradation in any of its elements or in ambient conditions results in a higher noise value until either the defect has been obviated or natural conditions return to the design norm. While an increase in transmitter power will tend to minimize the effect of noise, this solution is not entirely satisfactory since the efficiency of the communication system, and if there be one, the local power generating equipment will suffer. Moreover, a boost in power output will inevitably be accompanied by a higher cost either in the expended electricity or the generator fuel consumption. Needless to say, if the generators are preloaded for optimum efficiency, the load being withdrawn as the communication system's demands increase, the efficiency is stabilized, however, the increased cost, while minimized, is continuously present.

It is therefore the object of this invention to provide an arrangement for minimizing the effect of noise particularly intermodulation noise simply, economically and automatically.

It is a further object of this invention to satisfy the first object by employing circuitry inherently present in devices of the kind under consideration and with as little adjunct equipment as possible.

The above mentioned and other features and objects of this invention and the manner of attaining them will become more apparent and the invention itself will best be understood by reference to the following description of embodiments of the invention taken in conjunction with the accompanying drawings wherein.

Figures 1, 2:
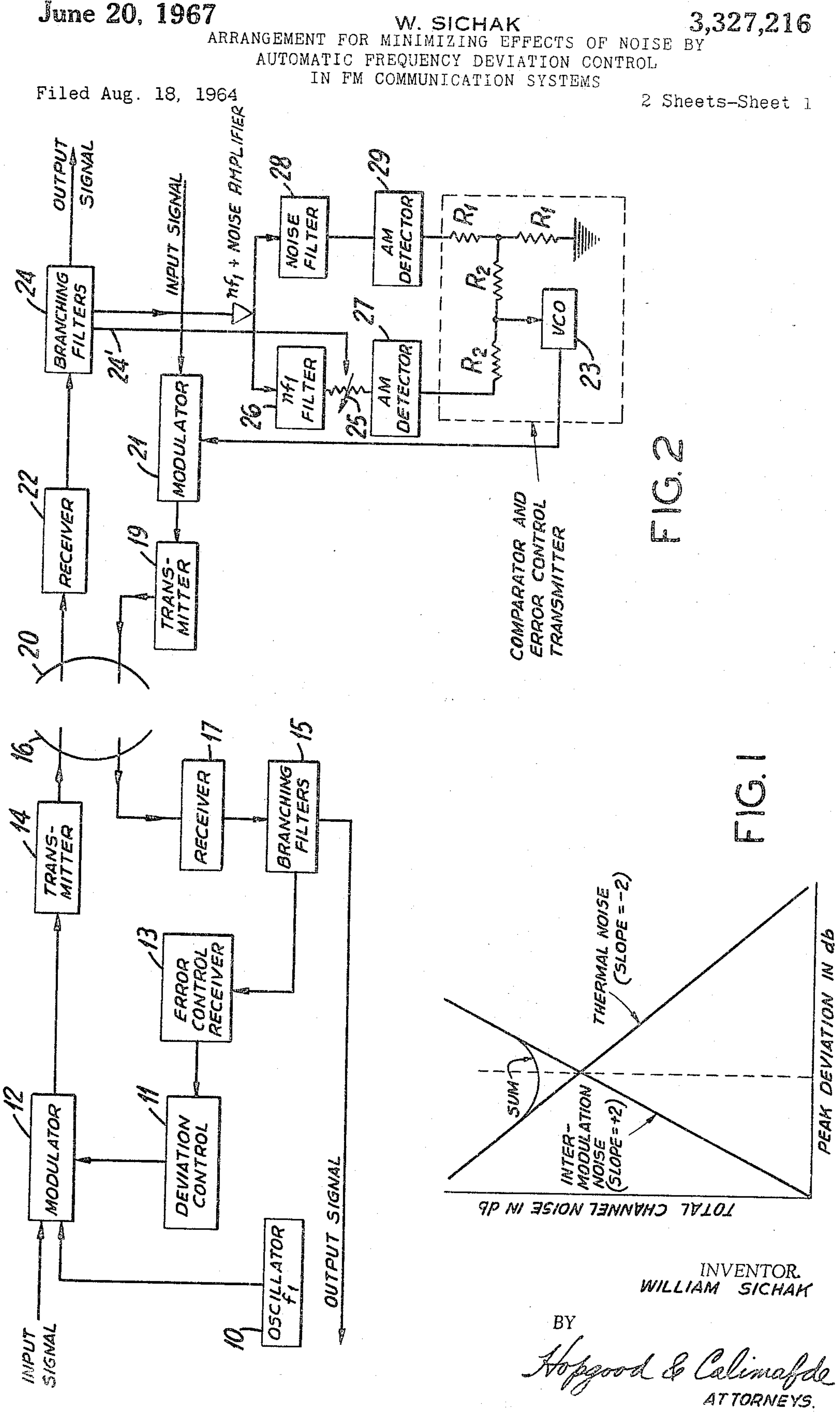
FIG. 1 is a graphic illustration of noise as a function of frequency deviation.
FIG. 2 is a block schematic of a transmitter and receiver incorporating one embodiment of the invention.
Figures 3A, 3B, 3C, 4, 5A, 5B, 5C, 5D:
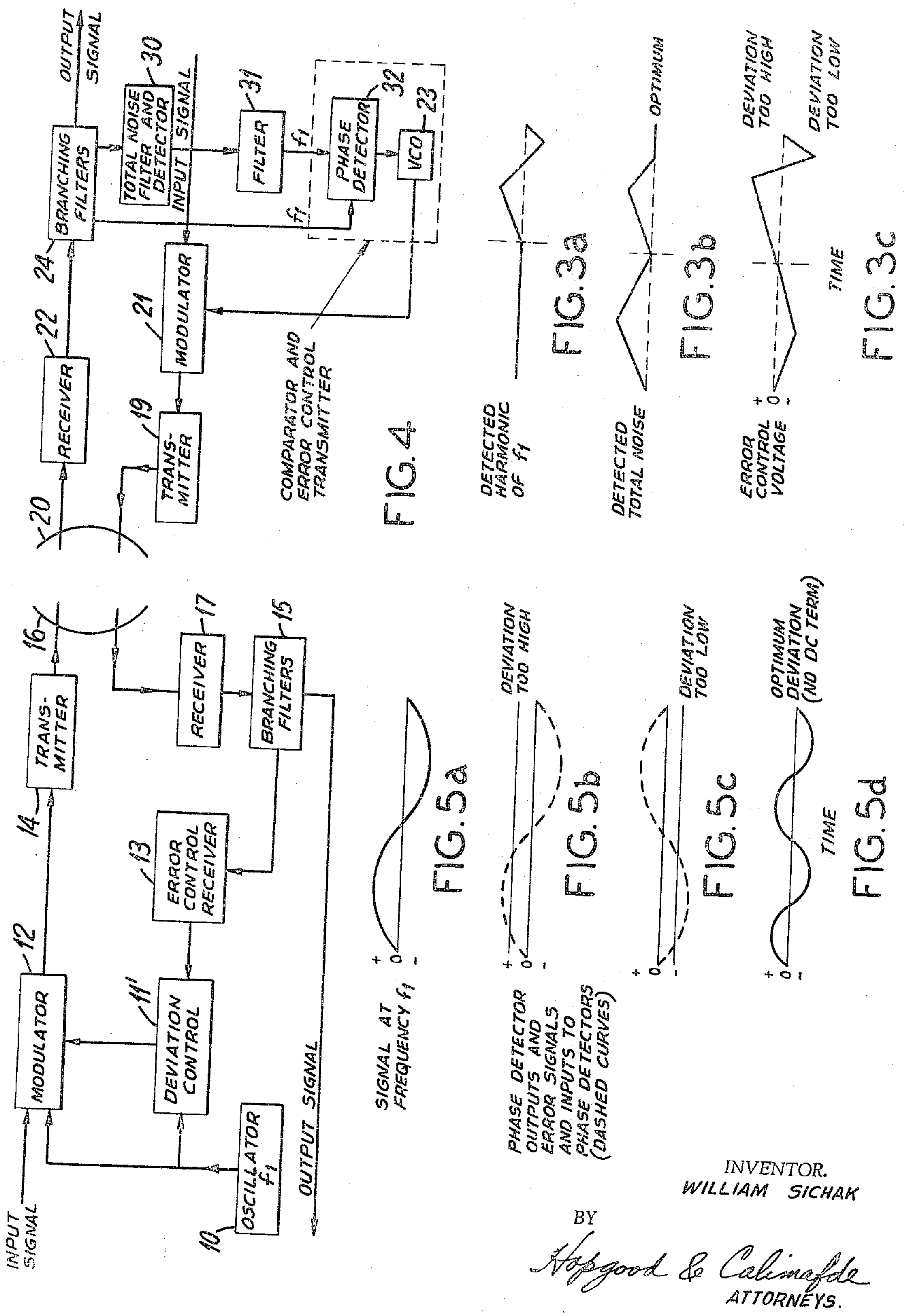

FIGS. 3*a* to 3*c* show waveforms at various points within the inventive arrangement of FIG. 2;

FIG. 4 illustrates in block schematic form a transmitter and receiver incorporating a second embodiment of the invention; and FIGS. 5*a* to 5*d* show waveforms at various points within the inventive arrangement of FIG. 4.

Before entering upon a detailed description of the invention, and in order to lay a proper foundation for an understanding of the basis upon which it is predicated, the generation of the noise itself will first be briefly discussed.

In FM systems the total thermal noise power depends upon the transmitter power, antenna gains, receiver noise figure, frequency deviation, distance, number of channels, output bandwidth, etc. This dependency is well known to those skilled in the art, and since the exact form of the dependence is not important here, it will not be discussed except as required. The intermodulation noise depends upon some, not all, of these factors, but in a different manner. To illustrate, frequency deviation (the excursion in frequency—analogous to that in amplitude in an AM system) will be taken as the independent variable and the noise analyzed as a function thereof.

The thermal noise ($N_t$) in the receiver output may be written as:

$$N_t = A/D^2 \qquad (1)$$

where $D$=frequency deviation and
$A$=all other factors which affect the thermal noise.

The intermodulation noise ($N_I$) on the other hand is:

$$N_I = BD^2 \qquad (2)$$

where $D$ again equals the frequency deviation and
$B$=all other factors which affect the intermodulation noise.

(Note: This dependence holds true for the range of parameters now available, and may differ in the future as requirements change. While this may change the form of Equations 1 and 2 and even the conclusions drawn therefrom, the basic inventive concept remains applicable.)

The total noise power ($N_T$) is the sum of the terms in Equations 1 and 2 as follows:

$$N_T = N_t + N_I = A/D^2 + BD^2 \qquad (3)$$

Equations 1, 2 and 3 are graphically illustrated in FIGURE 1 as a function of the selected variable, frequency deviation, expressed in db. Here the direct and inverse relationships of intermodulation and thermal noise, respectively, with respect to frequency deviation may be seen. When the intermodulation noise is comparable to the thermal noise in the contemplated (design) range of frequency deviation, the total noise, $N_T$, is minimized when the frequency deviation (D) is made equal to $$\sqrt[4]{A_o/B_o}$$

where $A_o$ and $B_o$ are the values chosen during the design stage. The total noise output at any time may then be expressed as:

$$N_T = A/\sqrt{A_o/B_o} + B\sqrt{A_o/B_o} \qquad (4)$$

At the design point where $A = A_o$ and $B = B_o$ then $$N_T = \sqrt{A_oB_o} + \sqrt{A_oB_o} = 2\sqrt{A_oB_o} \qquad (4a)$$

Subsequent to installation the total noise will change, of course, as any of the above mentioned influencing factors in A or B changes. If the change decreases the total noise, its effect is important only if the percentage of time the system performance is acceptable is the limiting factor in the design. More usually the noise increases, and while an allowance can be and usually is made for natural causes, such as changes in the propagation constant, better performance can be obtained, and the cost and complexity of the original equipment can be lowered, by automatically minimizing the effect of these changes. To illustrate: let a factor which does not affect A and B in the same functional form, such as transmitter power, the receiver noise figure, or the propagation loss (for some systems) change. Assuming for example, the propagation loss increases by 12 decibels (16 times in power) from the design value, the total noise power becomes (from Equation 4)

$$N_T = \frac{16A_o}{\sqrt{A_o/B_o}} + \sqrt{A_oB_o} = 16\sqrt{A_oB_o} + \sqrt{A_oB_o} = 17\sqrt{A_oB_o} \qquad (5)$$

If now the frequency deviation is optimized to adapt to this new set of conditions, then $D=\sqrt[4]{16A_0/B_0}$ and the total noise power ($N_T$) is:

$$N'_T=\frac{16A_o}{4\sqrt{A_o/B_o}}+4B_o\sqrt{A_o/B_o}=4\sqrt{A_oB_o}+4\sqrt{A_oB_o}=8\sqrt{A_oB_o} \quad (6)$$

Thus it may be seen that whereas the noise, if the system were stable with respect to frequency deviation, is increased by a factor of 17, this value may be reduced to 8 (a ratio of about 3.3 db) by varying the deviation appropriately. It is assumed naturally that the system's original design allowed for such a change in frequency deviation. While the foregoing treated a propagation loss variation only, it is equally applicable to any pertinent parametric change.

FIGURE 2 illustrates an inventive embodiment for automatically varying the frequency deviation to adapt to such changes during operation. In this figure only one direction of transmission is depicted in order to avoid clouding the concept, however, it will be appreciated that just as the local transmitter utilizes, for the function to be described, its associated receiver, the remote transmitter likewise employs its associated receiver. That is, a mirror image of the circuitry shown would be employed for the reverse transmission direction. It may be noted that the usual protection and alarm provisions for the critical circuits are not shown.

In accordance with the invention, a frequency $f_1$ is generated locally by a oscillator 10 which may be one already present in the system (such as the usual pilot tone oscillator for failure indications). $f_1$ is then fed in parallel with the input intelligence ($f_1$ being selected to be significantly different from the input signal frequencies) to the local transmitter modulator 12 through a conventional filter arrangement (not shown). The combined signals are then applied to the remaining transmitter elements 14 and the radio wave is launched in the usual manner via the antenna 16.

The remote receiver antenna 20 applies the received signal to the receiver front end 22, and the frequency $f_1$ and an appropriate harmonic $nf_1$ is derived by the branching filters 24 (the intelligence signal being separated and appearing as an output signal) and applied to a control system. Here $ni_1$ (which is proportional to the intermodulation noise) and an accompanying sample of the total noise are amplified, preferably by a common amplifier to minimize variations which may not affect both components equally, and are separately detected, via the filters 26 and 28, by the AM detectors 27 and 29. At this juncture it bears mentioning that the harmonic $nf_1$ rather than the frequency $f_1$ is employed due to the large ratio in amplitude between the two and hence the greater effect of noise on the former. Further, to ensure that the level of $nf_1$ may be normalized (to remove the effect upon it by changes in the level of $f_1$ which are independent of noise) a separate gain control 25 is inserted in the $nf_1$ branch, which is responsive to the amplitude of $f_1$ appearing over the lead 24'.

The detected DC outputs are then fed to any type of comparator and error control transmitted which minimizes the interaction between the respective inputs. The depicted arrangement fulfills this requisite in a simple manner with the resistor network shown (in which $R_2$ is considerably greater than $R_1$) feeding the voltage controlled oscillator 23.

The control system generated error signal after being applied to the modulator 21 and transmitter 19, along with the input intelligence signal, is received by near end receiver 17 and applied to a branching filter 15 where the intelligence and error control signal are separately recovered. The error control signal is then passed through an error control receiver 13 which detects the VCO frequency and applies a control voltage to the frequency deviation control 11 which varies the near end deviation in accordance with the foregoing equations to minimize the total noise power at the remote receiver. Limits (not shown) are placed on the deviation control range to keep the deviation between limits which are determined by factors (such as transmitter output power which depends on the bandwidth for a given amplifier device) beyond the designer's control.

The error output is zero when $N_T=2N_I$. The deviation is optimum, positive when $N_T<2N_I$. The deviation is too high, negative when $N_T>2N_I$. The deviation is too low.

FIGURES 3*a*–3*c* show the waveforms at various points (denoted in the figures) in the system. The left half of the figure shows the open loop waveforms when only A in Equation 4 varies, while the right half shows the waveforms when only B in Equation 4 varies. In practice, both will vary simultaneously, however, here they are shown separately for clarity. After the loop is closed (i.e. when receiver's influence is felt at the transmitter and the deviation control is imposed) the waveforms will still vary, but on a much smaller scale than with the loop open.

The signal voltage output will tend to vary as the deviation changes, however, this variation may be easily removed by the regulator circuits normally used. If not, a standard regulator can be added.

It will be noted that the response time of the deviation control is limited only by the round trip delay (propagation delay plus delays due to filters) and can be set to any value above this minimum by standard techniques.

FIG. 4 illustrates an alternative arrangement. In this case, at the far end, a component at frequency $f_1$ is derived by rectifying the out of band noise and recovering $f_1$ via the total noise filter and detector 30 and filter 31. This component and the $f_1$ signal (similar to the level setting $f_1$ signal of FIG. 2) of the branch filter 24 are fed to a phase detector 32 where the two signal's phases are compared and the resultant DC signal employed to control the voltage controlled oscillator 23. The balance of the system (except as mentioned hereinafter) operates similarly to the first arrangement.

FIGURES 5*a* through 5*d* show the resulting open loop waveforms at the designated circuit points and are self explanatory. Suffice to say, the output of the phase detector is zero when the deviation is optimum, positive when the deviation is too high, and negative when the deviation is too low.

The second embodiment permits advantage to be taken of the permissible increase in frequency deviation as the number of channels decreases. That is, as the peak traffic period passes, the number of "up" channels will decrease and the frequency deviation per channel may be increased to provide greater relief from noise without encumbering further the intermodulation noise. This is accomplished by allowing the oscillator to feed both the near end modulator and the deviation control, thus compensating for the effect of the modulation on the pilot tone in the closed loop.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a frequency modulation radio communication system having a local transmitter including an intelligence signal modulator and a receiver adjunct, and a remote receiver including means for recovering the intelligence signal and a transmitter adjunct, the improvement therein for automatically minimizing the effect of noise upon a change in conditions influencing noise comprising:

means at the local transmitter for generating a test signal significantly distinct from the intelligence signal frequencies;

means for applying said test signal to the local transmitter modulator;

means connected to the remote receiver for deriving a noise error signal from a selected function of the test signal;

means at the remote receiver including said transmitter adjunct for transmitting said noise error signal;

means at the local transmitter including said receiver adjunct for recovering the noise error signal; and control means, coupled to the transmitter modulator and responsive to the noise error signal for varying the frequency deviation of the intelligence signal to thereby minimize the effect of noise.

2. In a frequency modulation radio communication system having a local transmitter including an intelligence signal modulator and a receiver adjunct, and a remote receiver including means for recovering the intelligence signal and a transmitter adjunct, the improvement therein for automatically minimizing the effect of noise upon a change in condition influencing noise comprising:

means at the local transmitter for generating a predetermined frequency;

means for applying said frequency to the local transmitter modulator;

means connected to the remote receiver for deriving a noise error signal from a selected harmonic of the said predetermined frequency;

means at the remote receiver including said transmitter adjunct for transmitting said noise error signal;

means at the local transmitter including said receiver adjunct for recovering the noise error signal; and control means coupled to the transmitter modulator and responsive to the noise error signal for varying the frequency deviation of the intelligence signal to thereby minimize the effect of noise.

3. The improvement claimed in claim 2 in which the means for deriving a noise error signal comprises:

means for recovering the selected harmonic plus noise;

branch means for separately detecting the selected harmonic and noise components; and means for comparing said components and deriving a noise error signal therefrom.

4. The improvement claimed in claim 3 further comprising:

gain control means disposed in one branch for normalizing the level of the selected harmonic in response to variations in the level of said predetermined frequency; and means coupled to said gain control means for recovering the said predetermined frequency.

5. The improvement claimed in claim 3 further comprising:

means disposed between said means for recovering the selected harmonic plus noise and said branch means, for amplifying the said harmonic and noise in common.

6. The improvement claimed in claim 3 in which said comparing and deriving means comprises a resistor network driving a voltage controlled oscillator.

7. The improvement claimed in claim 3 in which each of said branch means comprises a filter and an AM detector serial coupled thereto, the filter in one branch permitting the noise only and the filter in the other branch for permitting the selected harmonic only to pass therethrough.

8. In a frequency modulation radio communication system having a local transmitter including an intelligence signal modulator and a receiver adjunct, and a remote receiver including means for recovering the intelligence signal and a transmitter adjunct, the improvement therein for automatically minimizing the effect of noise upon a change in conditions influencing noise comprising:

means at the local transmitter for generating a predetermined frequency;

means for applying said frequency to the local transmitter modulator;

means connected to the remote receiver for deriving a noise error signal from a selected function of the said predetermined frequency, said means comprising means for separately recovering the predetermined frequency and the out of band noise, means for deriving the predetermined frequency from said out of band noise, and means for comparing the phases of the two thus derived predetermined frequency signals and deriving a noise error signal therefrom;

means at the remote receiver including said transmitter adjunct for transmitting said noise error signal;

means at the local transmitter including said receiver adjunct for recovering the noise error signal; and control means, coupled to the transmitter modulator and responsive to the noise error signal for varying the frequency deviation of the intelligence signal to thereby minimize the effect of noise.

9. The improvement claimed in claim 8, in which the radio communication system is multi-channel and in which the control means is also connected to said frequency generating means for allowing the deviation to act on a per channel basis depending upon the traffic load.

10. The improvement claimed in claim 8 in which the means for deriving the predetermined frequency from said out of band noise comprises:

means for detecting the out of band noise;

and filter means, serially coupled to said detecting means, for deriving the predetermined frequency component therein.

11. The improvement claimed in claim 10 in which the comparing and deriving means comprises a phase detector driving a voltage controlled oscillator.

References Cited

UNITED STATES PATENTS

| | | | |
|---|---|---|---|
| 2,924,703 | 2/1960 | Sichak et al. | 325—31 |
| 3,195,047 | 7/1965 | Ruthroff | 325—46 |
| 3,271,679 | 8/1966 | Fostoff | 325—15 X |

OTHER REFERENCES

German allowed application No. 1,125,495 (March 1962).

JOHN W. CALDWELL, *Acting Primary Examiner.*

B. V. SAFOUREK, *Assistant Examiner.*